United States Patent
McCown et al.

(10) Patent No.: US 10,491,631 B1
(45) Date of Patent: Nov. 26, 2019

(54) APPARATUS AND METHOD FOR AUGMENTING A MESSAGING APPLICATION WITH CRYPTOGRAPHIC FUNCTIONS

(71) Applicant: Anonyome Labs, Inc., Draper, UT (US)

(72) Inventors: Steven Harvey McCown, Mapleton, UT (US); Steve Shillingford, Draper, UT (US); Greg Clark, San Francisco, CA (US)

(73) Assignee: ANONYOME LABS, INC., Draper, UT (US)

( * ) Notice: Subject to any disclaimer, the term of this patent is extended or adjusted under 35 U.S.C. 154(b) by 102 days.

(21) Appl. No.: 15/636,497

(22) Filed: Jun. 28, 2017

Related U.S. Application Data (60) Provisional application No. 62/444,788, filed on Jan. 10, 2017.

(51) Int. Cl.
| | | |
|---|---|---|
| H04L 29/06 | (2006.01) | |
| H04L 9/08 | (2006.01) | |
| G06F 21/60 | (2013.01) | |
| H04L 9/06 | (2006.01) | |

(52) U.S. Cl.
CPC ............ *H04L 63/18* (2013.01); *G06F 21/602* (2013.01); *H04L 9/0618* (2013.01); *H04L 9/0894* (2013.01); *H04L 63/0428* (2013.01)

(58) Field of Classification Search
CPC ..... H04L 9/00; H04L 9/06; H04L 9/08; H04L 63/08; H04L 63/0428; H04L 29/06; G06F 21/60; G06F 21/10
USPC ............ 709/204–206; 713/150–152; 726/26
See application file for complete search history.

(56) References Cited

U.S. PATENT DOCUMENTS

| | | | | |
|---|---|---|---|---|
| 8,521,821 | B2 * | 8/2013 | van der Horst | H04L 63/0428 345/629 |
| 8,644,516 | B1 * | 2/2014 | Le Saint | H04L 63/0421 380/259 |
| 9,372,987 | B1 * | 6/2016 | Ashley | G06F 21/6254 |
| 9,374,689 | B1 | 6/2016 | Ashley et al. | |
| 9,703,986 | B1 | 7/2017 | Ashley et al. | |
| 9,729,519 | B1 * | 8/2017 | Ashley | H04L 63/0428 |
| 10,178,106 | B1 | 1/2019 | Ashley et al. | |
| 10,320,753 | B1 | 6/2019 | Ashley et al. | |
| 2005/0076089 | A1 * | 4/2005 | Fonseca | H04L 12/1859 709/206 |
| 2009/0016333 | A1 * | 1/2009 | Wang | H04L 65/80 370/389 |
| 2011/0302405 | A1 * | 12/2011 | Marlow | H04L 9/0841 713/150 |
| 2012/0198235 | A1 * | 8/2012 | Kotla | H04L 9/0861 713/171 |
| 2012/0204032 | A1 * | 8/2012 | Wilkins | H04L 9/006 713/170 |

(Continued)

*Primary Examiner* — Saleh Najjar
*Assistant Examiner* — Khalid M Almaghayreh
(74) *Attorney, Agent, or Firm* — Cooley LLP (57) ABSTRACT

A machine has a processor and a memory connected to the processor. The memory stores instructions executed by the processor to execute a messaging application to coordinate exchanges of messages over a network. A secure channel is maintained separate from the messaging application. The secure channel processes cryptographic blocks delivered to and received from the message application.

7 Claims, 6 Drawing Sheets

(56) References Cited

U.S. PATENT DOCUMENTS

2012/0210119 A1* 8/2012 Baxter .................... H04L 63/08
                                                          713/150
2016/0351080 A1* 12/2016 Bhatnagar ................ G09C 5/00
2017/0063816 A1* 3/2017 Ackerly .............. H04L 63/0428
2018/0254892 A1* 9/2018 Egorov ................ H04L 9/0819

* cited by examiner

```
{
    "url": "http://mywebmail.com",
    "subject" : {
        "subject_field": "subject_field_name",
        "xPosition" : 100, "yPostion" : 100,
        "width" :    100, "height" : 25
    },
    "sender" : {
        "sender_field": "subject_field_name",
        "xPosition" : 100,   "yPostion" : 150,
        "width" :    100,   "height" : 25
    },
    "recipient" : {
        "recipient_field": "subject_field_name",
        "xPosition" : 100,   "yPostion" : 200,
        "width" :    100,   "height" : 25
    },
    "email_body" : {
        "email_body_field": "email_body_field_name",
        "xPosition" : 100,   "yPostion" : 250,
        "width" :    100,   "height" : 25
    }
}
```

APPARATUS AND METHOD FOR AUGMENTING A MESSAGING APPLICATION WITH CRYPTOGRAPHIC FUNCTIONS

CROSS-REFERENCE TO RELATED APPLICATION

This application claims priority to U.S. Provisional Patent Application Ser. No. 62/444,788, filed Jan. 10, 2017, the contents of which are incorporated herein by reference.

FIELD OF THE INVENTION

This invention relates to communications in computer networks. More particularly, this invention is directed toward techniques for augmenting a messaging application with cryptographic functions.

BACKGROUND OF THE INVENTION

There are a wide range of messaging applications, such as email applications, text messaging applications and messaging applications within social network applications. Such messaging applications provide communication systems, protocols, and clients that supply users with a variety of interoperable choices. This myriad of options can prove daunting for users, most of whom select a small subset of options across desktop, portable, and mobile environments. In addition to managing a number of messaging application options that users select, there is often a desire to enforce separate business, home, school, and hobby environments.

With the amount of fraud, phishing, eavesdropping, and other exploits on the Internet, many users are quickly moving towards encrypting their email communications. However, managing encryption keys (e.g., securely creating, storing, and transporting keys) is challenging for most users and deters them from using encryption. This deterrent is compounded if the user needs to maintain separate usage environments (e.g., business and hobby) on the same computer.

Installable email client applications (e.g., MS Outlook® or Apple Mail®) have simplified the encryption process for users by implementing secure messaging protocols (e.g., S/MIME, OpenPGP, etc.). However, Web Browser-Based Applications (a.k.a., Web Clients) have trouble implementing end-to-end encryption and secure key management due to an architecture consisting of server-side web pages and typically the absence of an Application Program Interface (API) to enable third parties to add custom encryption services. This leaves web mail users without a secure email solution. Moreover, data entry within a messaging application may be subject to automatic backup and eavesdropping that may comprise communications.

Accordingly, there is a need for techniques to augment a messaging application with cryptographic functions.

SUMMARY OF THE INVENTION

A machine has a processor and a memory connected to the processor. The memory stores instructions executed by the processor to execute a messaging application to coordinate exchanges of messages over a network. A secure channel is maintained separate from the messaging application. The secure channel processes cryptographic blocks delivered to and received from the message application.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
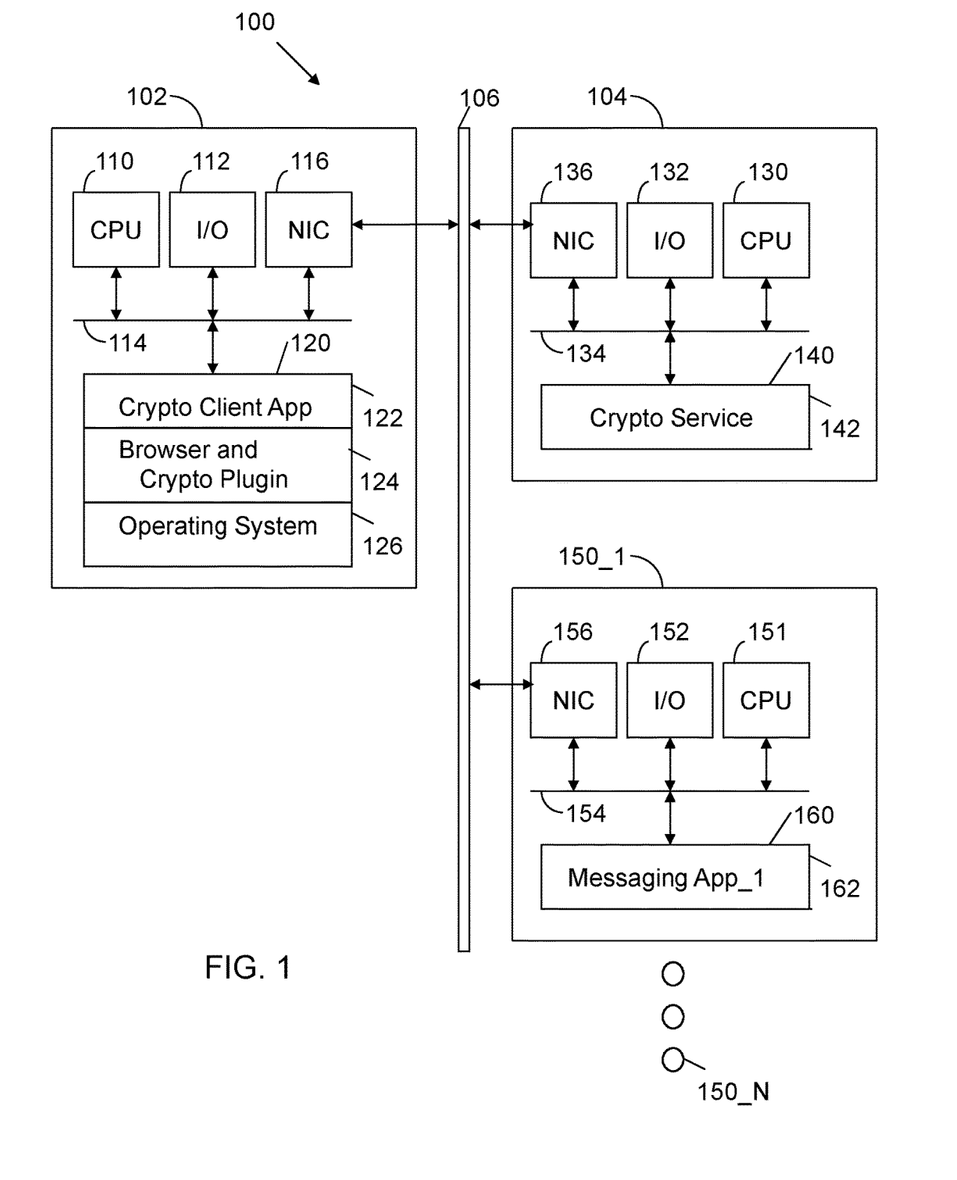
FIG. 1 illustrates a system configured in accordance with an embodiment of the invention.

FIG. 1 illustrates a system 100 configured in accordance with an embodiment of the invention. The system 100 includes a client device 102 connected to a server 104 via a network 106, which may be any combination of wired and wireless networks.

The client device 102 may be a computer, tablet, mobile device, game counsel, wearable device and the like. The client device 102 includes a processor (e.g., a central processing unit) 110 connected to input/output devices 112 via a bus 114. The input/output devices 112 may include a keyboard, mouse, touch display and the like. A network interface circuit (NIC) 116 is also connected to the bus 114 to provide connectivity to network 106.

A memory 120 is also connected to the bus 114. The memory 120 stores instructions executed by the processor 110. In particular, the memory stores a cryptographic (crypto) client application 122, which includes instructions to implement operations disclosed herein. The memory 120 may also store a browser with a crypto plugin 124. The crypto plugin may augment the operations performed by the crypto client application 122. The memory 120 also stores an operating system 126, which operates in conjunction with the crypto client application 122 and browser 124 to implement operations disclosed herein.

The server 104 includes a processor 130, input/output devices 132, a bus 134 and a network interface circuit 136. A memory 140 is connected to the bus 134. The memory 140 stores instructions executed by the processor 130. More particularly, the memory 140 stores a crypto service 142. The crypto service 142 manages cryptographic keys. In addition, the crypto service may perform cryptographic operations (e.g., encryption, decryption, signing), as requested by the crypto client application 122. Alternately, the crypto client application 122 may perform the cryptographic operations and rely upon the crypto service 142 as a key management service.

Also connected to the network are messaging servers 150_1 through 150_N. Each messaging server supports messaging applications to facilitate network communications between different client devices 102 connected to network 106. Each messaging server 150 includes a central processing unit 151, input/output devices 152, a bus 154 and a network interface circuit 156. A memory 160 is connected to the bus 154. The memory stores a messaging application 162 to support one or more of email messaging, text messaging or messaging within a social network application.

Figure 2:
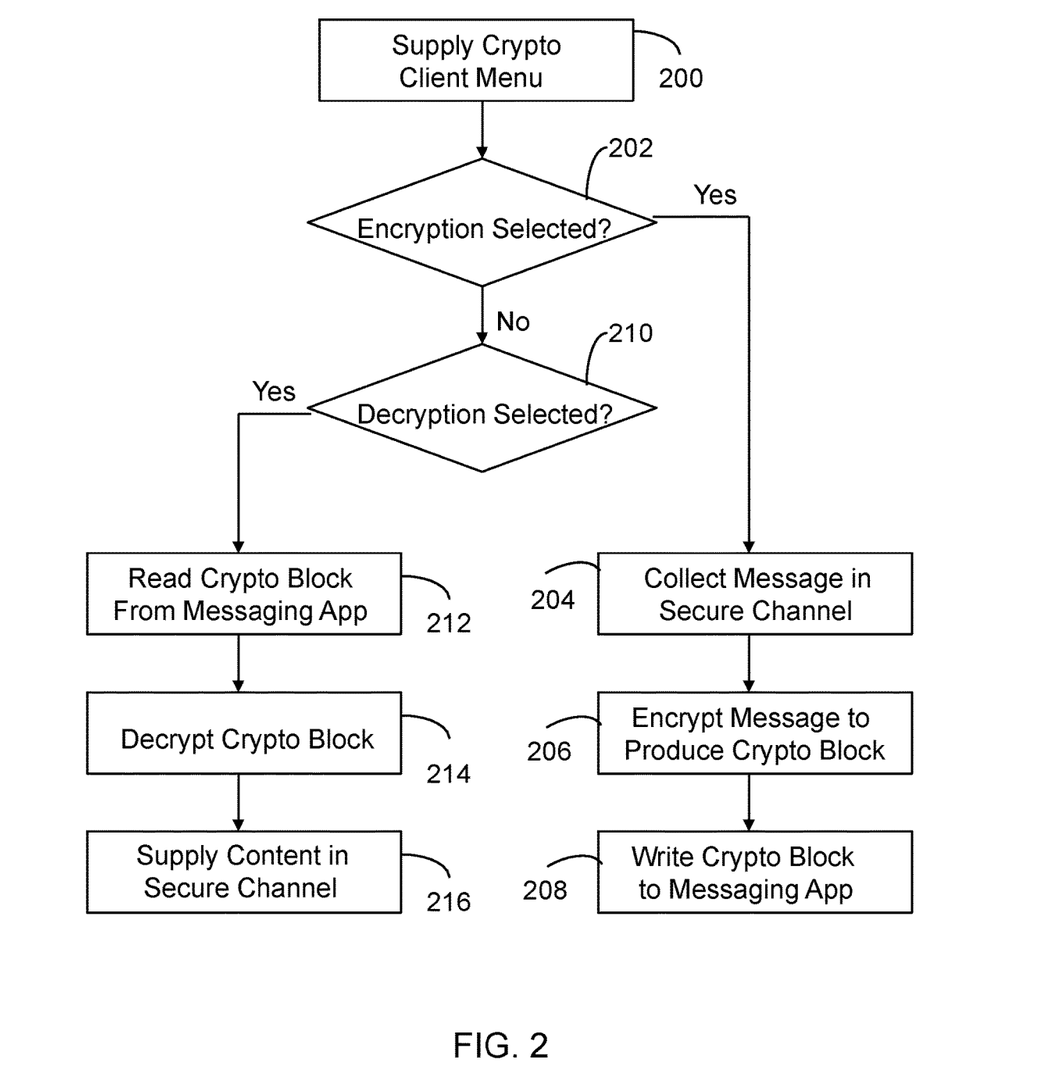
FIG. 2 illustrates processing operations associated with an embodiment of the invention.
Figure 3:
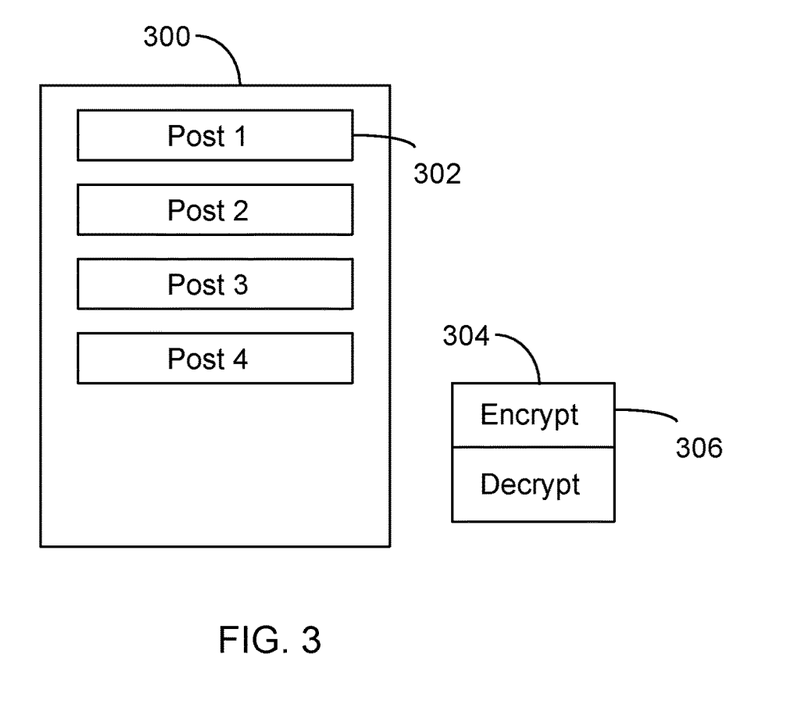
FIGS. 3-10 illustrate user interfaces utilized in accordance with embodiments of the invention.

FIG. 2 illustrates processing operations associated with an embodiment of the invention. A crypto client menu is supplied to a user 200. FIG. 3 illustrates a social network interface 300, which includes a number of social network posts 302. Each social network post is a message shared by at least one other user of the social network. The crypto client application 122 is configured to supply a menu in conjunction with the social network interface 300. For example, clicking on the crypto client application 122 while the social network interface 300 is displayed may result in the rendering of menu 304, with an option to encrypt 306 a communication.

Figure 4:
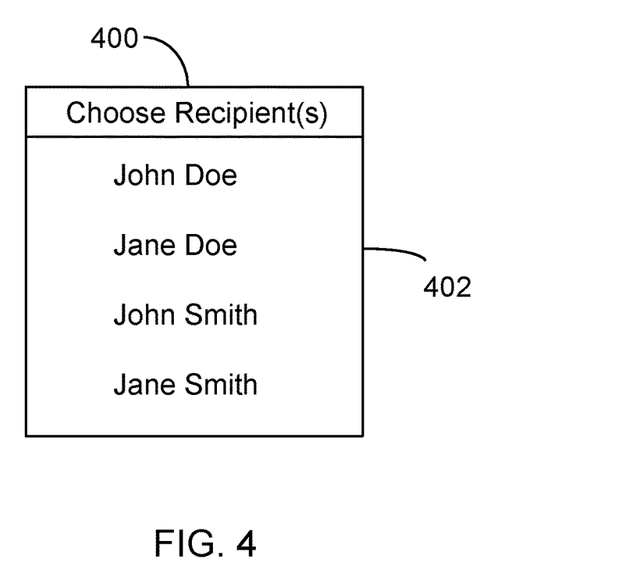
Figure 5:
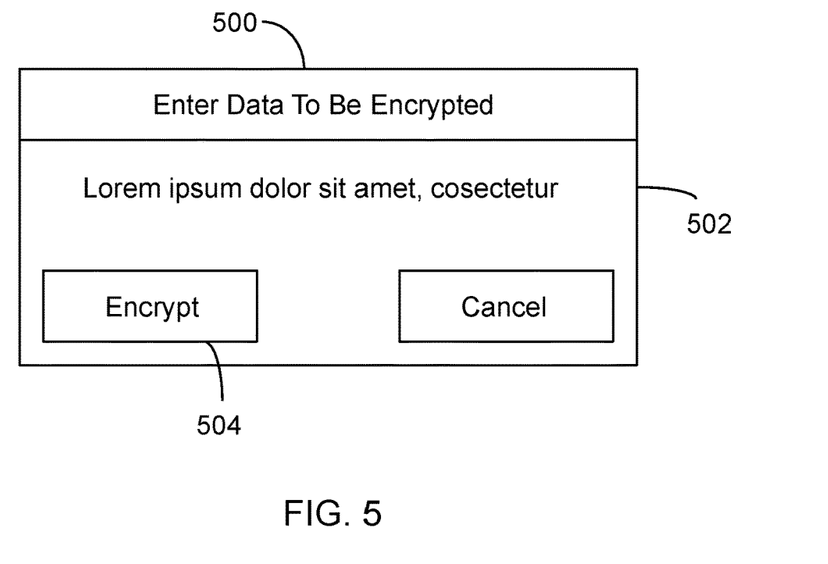

Returning to FIG. 2, if the encryption menu option is selected (202—Yes), a message is collected in a secure channel 204. Prior to collecting a message, a user may be supplied with a list of recipients, such as shown with user interface 400 of FIG. 4, which has a list of potential recipients. After choosing at least one recipient, the user is prompted to enter data to be encrypted. FIG. 5 illustrates a user interface 500 with such a prompt. The user then enters a message in a data entry block 502. The user is also supplied with a prompt 504 to encrypt the content within the data entry block 502.

Returning to FIG. 2, if the prompt 504 is activated, the message is encrypted to produce a crypto block 206. The crypto block is then written to the messaging application 208.

Observe that the messaging application (e.g., 300 of FIG. 3) operates separately from the crypto client application 122. The crypto client application maintains a secure channel separate from the messaging application. For example, the data entry block 502 of FIG. 5 is separate from the messaging application. As a result, message backup or eavesdropping activity associated with the messaging application do not capture the content entered in the secure channel established by the crypto client application 122. The secure channel is a network communication pathway separate from the messaging application. In addition to security arising from a separate pathway, the pathway itself may be subject to additional security through a crypto process, such as a Secure Socket Layer or pathway encryption.

The crypto client application 122 may process cryptographic blocks. Such operations may be supplemented with use of a crypto plugin associated with browser 124. The crypto client application 122 may also request that the cryptographic block processing be performed by the crypto service 142 of server 104. Regardless of the technique used to encrypt a message, the resulting crypto block is written to the messaging application, as shown with block 208 of FIG. 2. For example, the crypto client application 122 may include executable code that directs the operating system 126 to write the crypto block to the messaging application. In particular, the crypto client application 122 may direct the operating system kernel memory manager to select a memory segment corresponding to the crypto block. The operating system 126 may then pass the crypto block to the browser with the crypto plugin 124. The browser with the crypto plugin 124 interacts with the messaging application to write the crypto block as a post or other message in cypher form.

Figure 6:
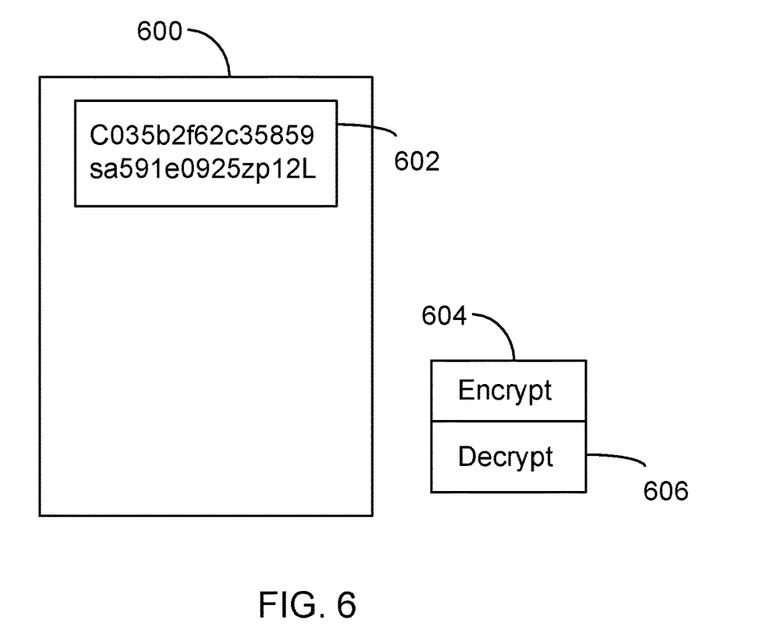
Figure 7:
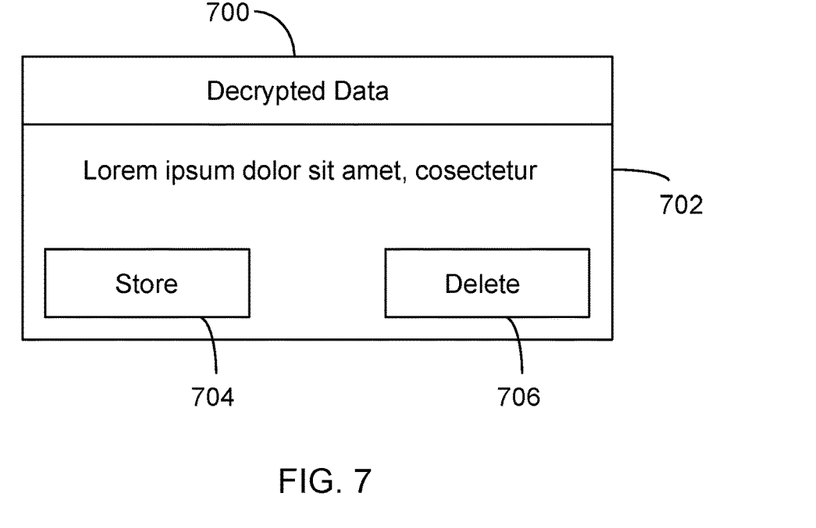

Returning to FIG. 2, if decryption is selected (210—Yes), the crypto block is read from the messaging application 212. FIG. 6 illustrates a messaging application 600 with a crypto block post 602. Upon receipt of such a message, the user may again invoke the crypto client application 122 and obtain menu 604, which allows one to select a decrypt option 606. Alternately, the crypto client application 122 may be configured to automatically identify encrypted content in a received message. In such a case, the crypto client application 122 may automatically decrypt the content. If the decrypt prompt 606 is selected or if automatic decryption is enabled, the crypto block is decrypted, as shown in block 214 of FIG. 2. The crypto block may be obtained from the messaging application using techniques similar to those discussed in connection with writing a crypto block to a messaging application. The decrypted content is then supplied in a secure channel, as shown in block 216 of FIG. 2. FIG. 7 illustrates an interface 700 to display decrypted data in a message area 702. The interface 700 may also include an option to store the message 704 or delete the message 706. If the user requests to store the message, then the crypto client application 122 stores the message as an entry in a thread between the message sender and the message recipient.

As previously indicated, web-based email systems have encryption capability. The downside of such systems is that they tend to be closed systems that are not interoperable with other standard MIME-based email systems. While closed systems sometimes acquire a large number of in-system users and they often employ strong encryption (e.g., WhatsApp®, ProtonMail®), their closed nature keeps them from operating in the larger and more general communication environment (e.g., email), which is used for a much larger array of business and personal communication.

Plug-ins, Add-Ons, or Web Browser Extensions (e.g., Extensions; a.k.a., Safari® Web Extensions in Apple® environments) facilitate the addition of new functionality to the browser and modifications to the web pages displayed. When extensions are used to add new functionality, they are manifest through additional User Interface (UI) elements such as additional context menu items or toolbar buttons. Extensions used to modify displayed web pages can take on numerous forms, which include adding new JavaScript®. Another key capability that extensions have is the ability to launch or communicate with other applications on the system. These features give extensions significant capabilities.

In order to overcome the insecurities associated with traditional email web clients while maintaining an interoperable communication environment, the disclosed system and method provide for encrypting email data for web clients. For example, the social media interface 300 of FIG. 3 may instead be an email web client. In addition to adding encryption, using extensions in this manner will enable users to change their usage scenarios (e.g., separate environments for business, home, school, and hobbies, etc.).

In order to encrypt data using a web client interface, both encryption algorithms and encryption keys need to be accessible to the web client application. Occasionally, web browser vulnerabilities arise that might compromise the security of the browser. Given the sensitivity and projected lifespan of the encryption keys, it is prudent to keep the encryption keys (and therefore the encryption key algorithms) separate from the browser itself. Web browser extensions can be used to communicate with applications outside of the web browser (e.g., crypto service 142). In this case, this communication mechanism can be used to communicate with an application that will encapsulate the encryption/decryption algorithms, as well as, perform the encryption key management functions.

Figure 8:
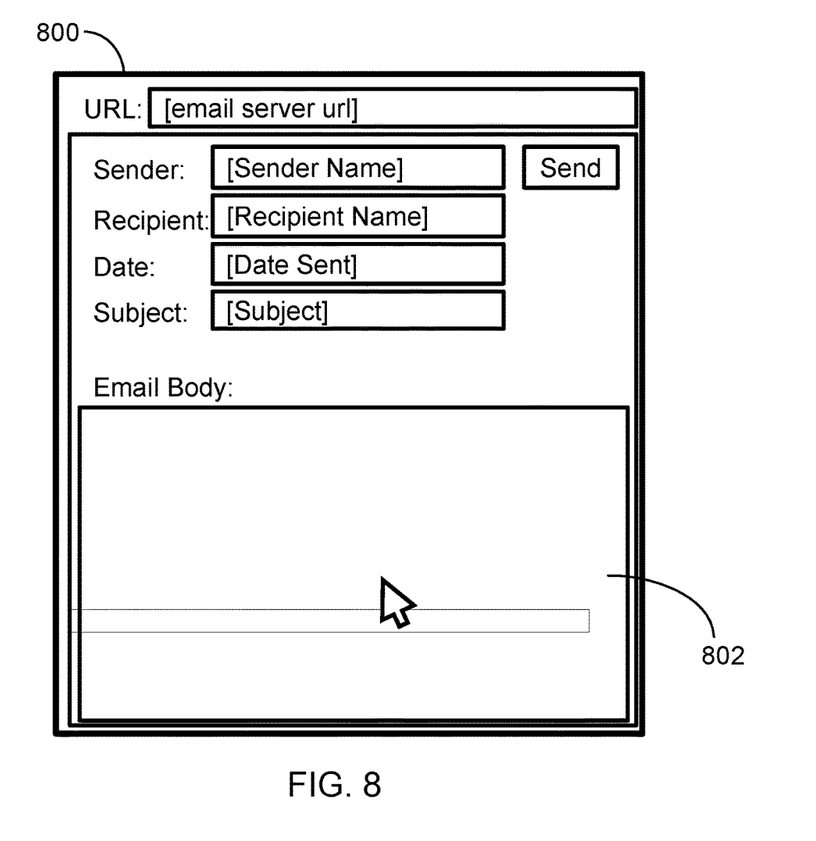

FIG. 8 illustrates an alternate embodiment of the invention incorporated into a web client email interface 800. A gesture may be used in the text entry region 802 or by a special command to invoke a pop-up menu, such as 304 of FIG. 3. If the user chooses to encrypt by selecting item 306, menu 400 of FIG. 4 is supplied, followed by interface 500 of FIG. 5. These interfaces may be supplied over or adjacent to interface 800. Similarly, if the text entry block 802 receives an encrypted message, such as 602 of FIG. 6, menu 604 may be invoked. Selection of the decrypt option 606 results in decrypted text 702 of FIG. 7 appearing in block 802 or in an adjacent interface, such as interface 700 of FIG. 7.

In order to put new non-editable text fields (that present a pop-up window) on third party web pages, it is necessary to know the visual layout of the web page in order to know where to best place the new fields. Additionally, it is necessary to know how and where the web page field data is stored (within the web page), so that it can be copied, inserted, or replaced during the cryptographic operations. Since all web pages differ, these layouts must be individually collected and mapped by either a manual or automatic process.

Figure 9:
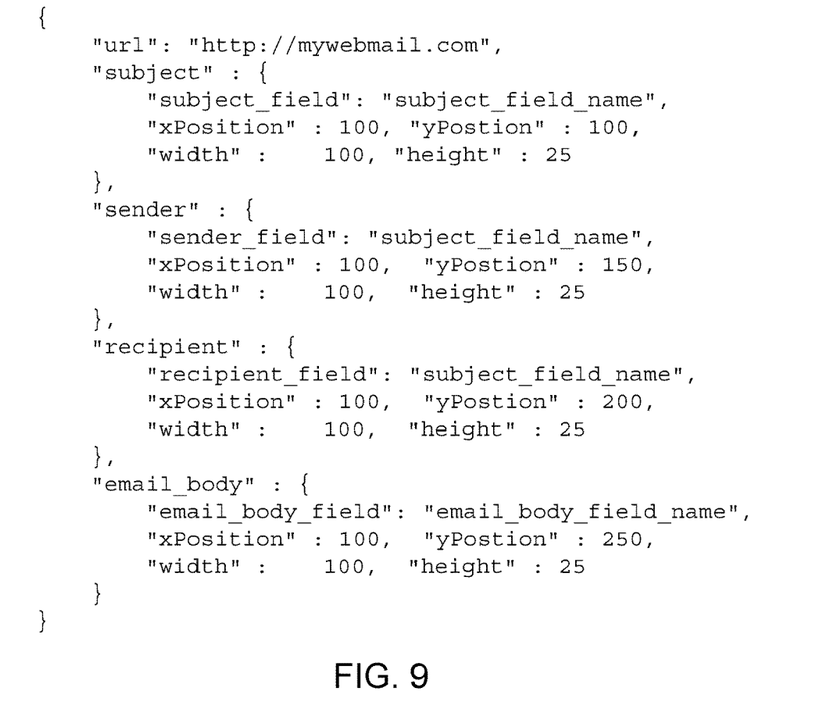

Once the data and appearance layout information is collected, the associated layout information for the new fields (and their operations) must also be specified. For simplicity in using this collected and specified information, data modeling structures (e.g., JSON, XML, etc.) should be used. FIG. 9 shows one example of how the information layout for a single web client entry could appear.

This sample structure shows the webpage URL, as well as, the subject field, sender field, recipient field, and email body field names and locations. Once the structured data information is collected for each website/webpage, it can be stored in a local database where it can be accessed upon subsequent visits to the site. This enables it to be recalled and used during subsequent visits to a documented website. Since webpages can change over time, it is important to periodically re-visit the sites to confirm that no changes have occurred. If changes have occurred, then it will be necessary to re-verify the important data fields and their positions from the source web page. An automated process can scan each website in the database on a regular basis to check for changes. Additionally, a verification scan can be done during each webpage access (i.e., when sending or reading an encrypted email).

Sometimes adding a non-editable text field that will display a pop-up window in response to a mouse clock or tap on the field does not fit well with the source web page architecture, source code, or graphical layout. In these instances, using a menu is a better option. For example, the menu 304 of FIG. 3 may be presented as an overlay or adjacent to the email client 800 of FIG. 8. Encrypt and decrypt operations may then be performed in the manner discussed above.

The previously discussed encryption processes, which use either a non-editable text field that displays a pop-up window or menu, rely on using text fields contained within the web client's webpage to enter the email information. These are great models, but they leave the plaintext data within the web client's control. This can be problematic for security, because some web clients periodically backup email drafts while the sender is typing. While drafts are useful, they have the effect of uploading the plaintext (unencrypted) email data to 'the cloud' before it can be encrypted. By uploading unencrypted data (even to the email hosting service's cloud), it violates the principles of information security and end-to-end encryption.

In order to achieve greater information security and better protect the unencrypted data, using a separate pop-up window is a better option. This pop-up window should be uniquely named and located within the extension or otherwise kept outside of the web client's control (e.g., outside of the Document Object Model (DOM)). For example, the encryption interface 500 of FIG. 5 may be placed over or adjacent to the interface 800 of FIG. 8. Similarly, the decryption interface 700 of FIG. 7 may be placed over or adjacent to the interface 800 of FIG. 8.

Using this method, the unencrypted email text information is kept outside of the web client's control while it is being created and is only introduced into the web client once it is encrypted. This is increases email security and helps a user protect their privacy.

Many users choose to protect (or augment) their online privacy by consolidating certain online accounts (and usage) into scenario-based identities (a.k.a., avatars or personas). These identities can consist of various accounts, settings, data, or processes that are unique to a given scenario or activity. In one embodiment, this will help a user keep their home usage data separate from their work data without the cost of maintaining multiple computers or the complexity of setting up multiple user accounts within the same computer. In other embodiments, users can maintain separate identities for home, work, education, social media, etc.

Figure 10:
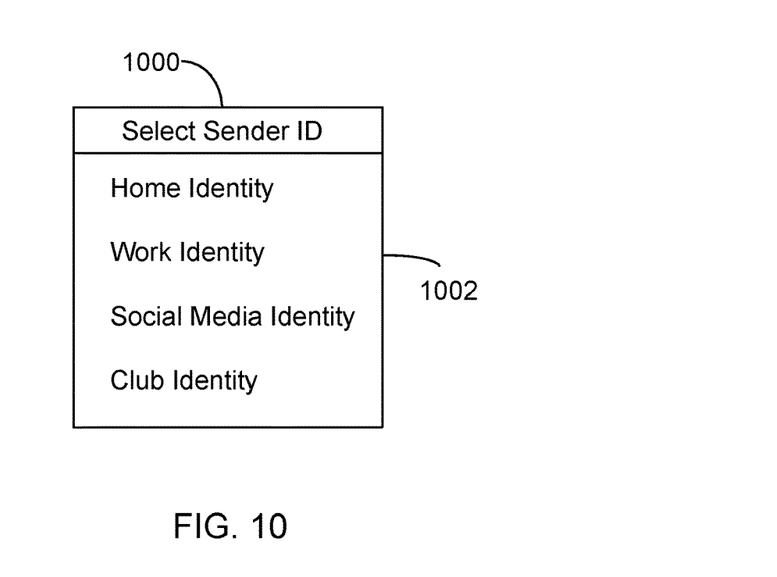

As a notable example, Sudo® App (https://sudoapp.com) and SudoPay® are applications that demonstrate how to create, manage, and use various online identities and accounts. When using user-selectable identities within the scope of this invention, it is useful to allow the users to select their encryption based on which identity they choose to use in a given situation. FIG. 10 illustrates an identity selection interface 1000 that may be used in accordance with an embodiment of the invention. The interface 1000 lists 1002 different identities that may be used for a messaging communication. For example, this interface may be presented when a user selects an encrypt option. Each identity has synthetic identity attributes operative as a personal privacy proxy with compartmental identity attributes. The synthetic identity may include a synthetic identity name, a synthetic identity phone number, a synthetic identity email address, a web browser setting and a system configuration setting, The user then chooses the recipient, for example, using interface 400 of FIG. 4. Alternatively, a recipient can be inferred (by correlating the recipient field data with existing entries from the identity's address book) and pre-selected in order to avoid an extra selection step. At this point, the "Enter Data To Be Encrypted" interface 500 of FIG. 5 is displayed so that the user can enter their plaintext data and press the encrypt button 504. Pressing the encrypt button 504 results in the processing of block 204, 206 and 208 of FIG. 2. The previously discussed decrypt operations may then be performed by the message recipient.

Throughout this disclosure, an architecture that splits the encryption processes and key management functions (split encryption architecture) from messaging applications has been presented. In several embodiments, this architecture is used to encrypt email, social media, etc. In another embodiment, the crypto client application 122 can also operate as a standalone application/service within a computing device (e.g., cell phone, tablet, laptop, desktop, or other computing platform) to provide encryption and key management functions for other third party applications. Connections to such third party applications can be made via any number of inter-application connection technologies. Such connection technologies include URL Schemes, inter-process communications, sockets, web services, file storage, etc. In additional embodiments, an authorization mechanism (e.g., PKI process, shared token, certificate, etc.) may be included to verify applications claiming to need access to these split encryption services. In other embodiments, these authentication mechanisms may include hardware, software, near proximity communications, location-based permissions, etc.

There are a number of standard methods to input a recipient's public keys. In one embodiment, the recipient's email address could be used to download their public key from a public key server, such as sever 104. In another embodiment, the recipient's email address could be used to extract their public key from the host computer's email contacts database. Alternatively, a manual process could allow a user to their contacts' public keys or identifiers.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a processor; and
a memory connected to the processor, the memory storing instructions executed by the processor to:
execute a messaging application to coordinate exchanges of messages between client machines connected to a combination of wired and wireless networks, and
execute a crypto client application to establish a secure channel separate from the messaging application, wherein the secure channel processes cryptographic blocks delivered to and received from the messaging application, wherein the crypto client application includes a crypto client data entry block separate from a messaging application data entry block and wherein the crypto client application includes instructions executed by the processor to:
collect a message in the crypto client data entry block,
encrypt the message to produce a first cryptographic block,
write the first cryptographic block to the messaging application,
read a second cryptographic block from the messaging application,
decrypt the second cryptographic block to produce a decrypted message, and
supply the decrypted message to the crypto client data entry block.

2. The machine of claim 1 wherein the crypto client application includes executable instructions to maintain a secure channel with a network connected cryptographic service.

3. The machine of claim 1 wherein the messaging application is a text messaging application.

4. The machine of claim 1 wherein the messaging application is a messaging application within a social network application.

5. The machine of claim 1 wherein the messaging application is an email application.

6. The machine of claim 5 wherein the email application is augmented to incorporate a cryptographic function prompt.

7. The machine of claim 1 further comprising instructions executed by the processor to supply a menu of sender identities, wherein each sender identity of the sender identities is a synthetic identity operative as a personal privacy proxy with compartmental identity attributes.

* * * * *